United States Patent
Donley et al.

(10) Patent No.: US 9,749,287 B2
(45) Date of Patent: Aug. 29, 2017

(54) INTERFACE DIRECTIONALITY ASSIGNMENT

(71) Applicant: Cable Television Laboratories, Inc., Louisville, CO (US)

(72) Inventors: Christopher Donley, Broomfield, CO (US); Christopher Grundemann, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 831 days.

(21) Appl. No.: 13/792,023

(22) Filed: Mar. 9, 2013

(65) Prior Publication Data

US 2014/0108597 A1 Apr. 17, 2014

Related U.S. Application Data

(60) Provisional application No. 61/712,318, filed on Oct. 11, 2012, provisional application No. 61/771,807, filed on Mar. 2, 2013.

(51) Int. Cl.
*H04L 12/935* (2013.01)
*H04L 29/12* (2006.01)
*H04L 12/24* (2006.01)
*H04L 29/06* (2006.01)

(52) U.S. Cl.
CPC .......... *H04L 61/2015* (2013.01); *H04L 41/08* (2013.01); *H04L 63/02* (2013.01)

(58) Field of Classification Search
None
See application file for complete search history.

(56) References Cited

U.S. PATENT DOCUMENTS

| | | | | |
|---|---|---|---|---|
| 2003/0223422 A1* | 12/2003 | Igarashi | ................ | H04L 1/1642 370/390 |
| 2004/0151202 A1* | 8/2004 | Mandavilli | ............. | H04L 45/02 370/463 |
| 2006/0159029 A1* | 7/2006 | Samuels et al. | ............. | 370/252 |
| 2006/0256736 A1* | 11/2006 | Koehler et al. | ................ | 370/254 |
| 2007/0183346 A1* | 8/2007 | Thubert | ................ | H04L 45/04 370/254 |
| 2010/0115083 A1* | 5/2010 | Oba | ...................... | H04W 36/30 709/224 |
| 2011/0182295 A1* | 7/2011 | Singh et al. | .................. | 370/401 |

OTHER PUBLICATIONS

Internet Engineering Task Force—Neighbor Discovery for IP version 6 (IPv6), RFC 4861 (Sep. 2007).*
Internet Engineering Task Force—Dynamic Host Configuration Protocol for IPv6 (DHCPv6), RFC 3315 (Jul. 2003).*
Microsoft Technet—How IPv6 Works (Mar. 2003) https://technet.microsoft.com/en-us/library/cc781672%28v=ws.10%29.aspx.*

* cited by examiner

*Primary Examiner* — Scott B Christensen
(74) *Attorney, Agent, or Firm* — Great Lakes Intellectual Property, PLLC.

(57) ABSTRACT

Assignment of directionality to interfaces, ports, receptacles, antennas and other input/output (I/O) employed by network devices to facilitate multi-device networking is contemplated. The directionality assignments may be used to facilitate assigning directionless and/or configurable router directionality in order to automatically, adaptively, dynamically or other otherwise facilitate inter-router connections within a multi-router network.

20 Claims, 5 Drawing Sheets

US 9,749,287 B2

INTERFACE DIRECTIONALITY ASSIGNMENT

CROSS-REFERENCE TO RELATED APPLICATIONS

This application claims the benefit of U.S. provisional Application No. 61/712,318 filed Oct. 11, 2012, and U.S. provisional Application No. 61/771,807 filed Mar. 2, 2013, the disclosures of which are incorporated in their entirety by reference herein.

TECHNICAL FIELD

The present invention relates to assigning directionality to interfaces employed by network devices to facilitate multi-device networking, such as but not necessary limited to assigning directionality to router interfaces used to facilitate inter-router connections within a multi-router network.

BACKGROUND

A multi-router network may be characterized as a network having a plurality of routers connected together and arranged in a logical hierarchy. With the launch of new services, such as but not limited to home security, IP video, Smart Grid, etc., and more consumer devices, such as but not limited to televisions, mobile phones, appliances, etc., being configured with routers, multi-router networks are becoming more prevalent. Multi-router networks require multiple routers to communicate with each other over network links, the establishment of messaging protocols, hierarchical relationships, address assignments, prefix delegations, security measures, backup capabilities and a potential number of additional functional capabilities in order to properly and securely govern network communications. As the prevalence of such multi-router networks continues to grow, one non-limiting aspect of the present invention contemplates a need to facilitate configuring routers to operate in such a complex environment.

As home networks grow in complexity and scale, it may become more common for users to make mistakes when physically connecting router interfaces together to form the multi-router network. There are various loops and improper connections that can occur when router interfaces are improperly connected, which may vary depending on the logical hierarchy of the multi-router network. An up-interface-to-up-interface connection error may occur when an up interface, also commonly referred to as a wide area network (WAN) interface or uplink port/connection, is connected to an up interface of another router on a common link. A-down-interface-to-down-interface connection error may occur when a down interface, also commonly referred to as a local area network (LAN) interface or downlink port/connection, is connected to a down interface of another router on a common link. Accordingly, one non-limiting aspect of the present invention contemplates a need to ameliorate inter-router connection mistakes.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
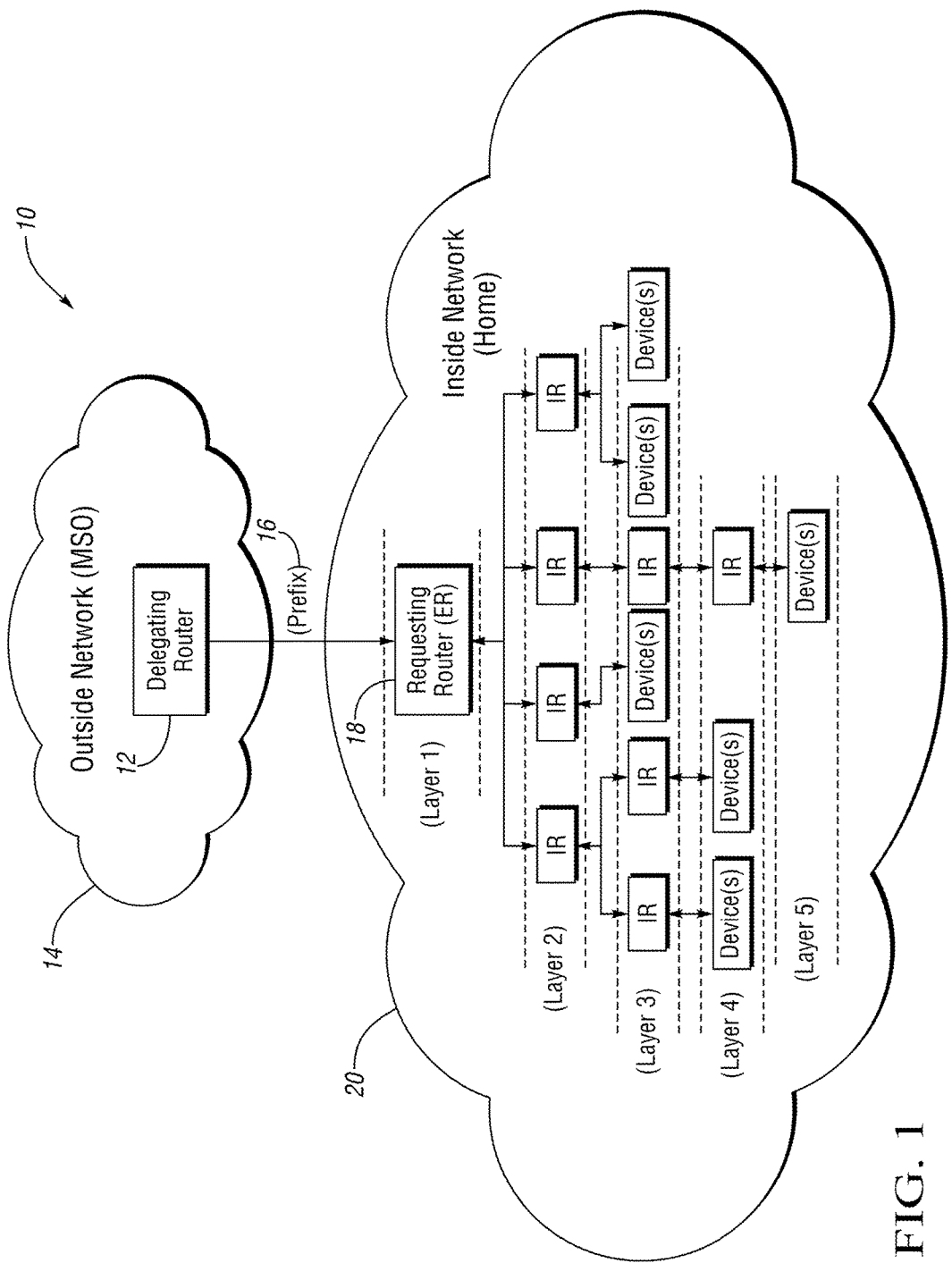
FIG. 1 illustrates a router system in accordance with one non-limiting aspect of the present invention.

FIG. 1 illustrates a router system 10 in accordance with one non-limiting aspect of the present invention. The system 10 illustrates one exemplary configuration where a delegating router 12 associated with an outside network 14 provides a prefix 16 (first prefix) to a requesting router 18 for delegation within an inside network 20. The prefix 16 may be any suitable addressing prefix, such as but not necessarily limited to an Internet Protocol version 6 (IPv6) prefix and an Internet Protocol version 4 (IPv4) prefix. The present invention is predominately described with respect to use of IPv6 without necessarily intending to limit the scope of the present invention. Dynamic Host Configuration Protocol (DHCP), such as that described in Internet Engineering Task Force (IETF) request for comment (RFC) 2131, 3315 and 3633, the disclosures of which are hereby incorporated by reference in their entireties, or other suitable delegation processes may be employed to facilitate delegating the first prefix to the requesting router 18. The requesting router 18 may be configured to facilitate adaptively delegating the first prefix 16 to additional routers associated with the inside network 20, such as in the manner described in U.S. patent application Ser. No. 13/783,242, the disclosure of which is hereby incorporated by reference in its entirety.

The outside network 14 and the inside network 20 demonstrate one exemplary, non-limiting use of the present invention where a multiple system operator (MSO), Internet service provider (ISP) or other type of service provider is allocated a prefix or addressing domain by a suitable addressing entity to facilitate Internet-based messaging or other network-based messaging. The inside network 20 is shown to be distinguished from the outside network 14 to demonstrated one use case where an MSO may be tasked with facilitating messaging for a plurality of inside networks, such as but not necessarily limited to home networks or other internal networks associated with its subscribers. While only one inside network 20 is illustrated, the MSO may be responsible for facilitating prefix delegation with any number of inside networks or other downstream connected networks. The requesting router 18, which may be periodically referred to herein as a customer edge router (CER) or edge router (ER) where routers connected downstream may be periodically referred to herein as internal routers (IRs). Optionally, the ER, IRs and/or devices may be configured to receive multiple prefixes, such as in the manner described in U.S. patent application Ser. No. 13/754,954, the disclosure of which is hereby incorporated by reference in its entirety.

A five layer architecture is shown to correspond with a first layer having the ER, a second layer having one or more IRs connected directly to the ER, a third layer having one or more IRs and/or devices connected to one of the second layer IRs, a fourth layer having one or more IRs and/or devices connected to one of the third layer IRs, and a fourth layer having one or more devices connected to one of the fourth layer IRs. The IRs and/or devices are shown to be connected to a single upstream ER or IRs as such devices may be configured to listen to no more than one delegating router/device on a link (solid lines) in order to comply with DHCP requirements. The single-connection of each component is shown for exemplary non-limiting purposes as the present invention fully contemplates the inside network having any number of configurations and interconnections between the ER, IRs and/or devices. The interconnections between the ER, IRs and devices are shown to correspond with wireline connections but may be similarly interconnected using wireless, radio frequency (RF), Bluetooth or other wireless types of links. The interconnections made using wireline connections, i.e., physical connections, may particularly problematic and susceptible to improper connection and/or looping, such as by an end user improperly connecting a cable between one router and another.

Figure 2:
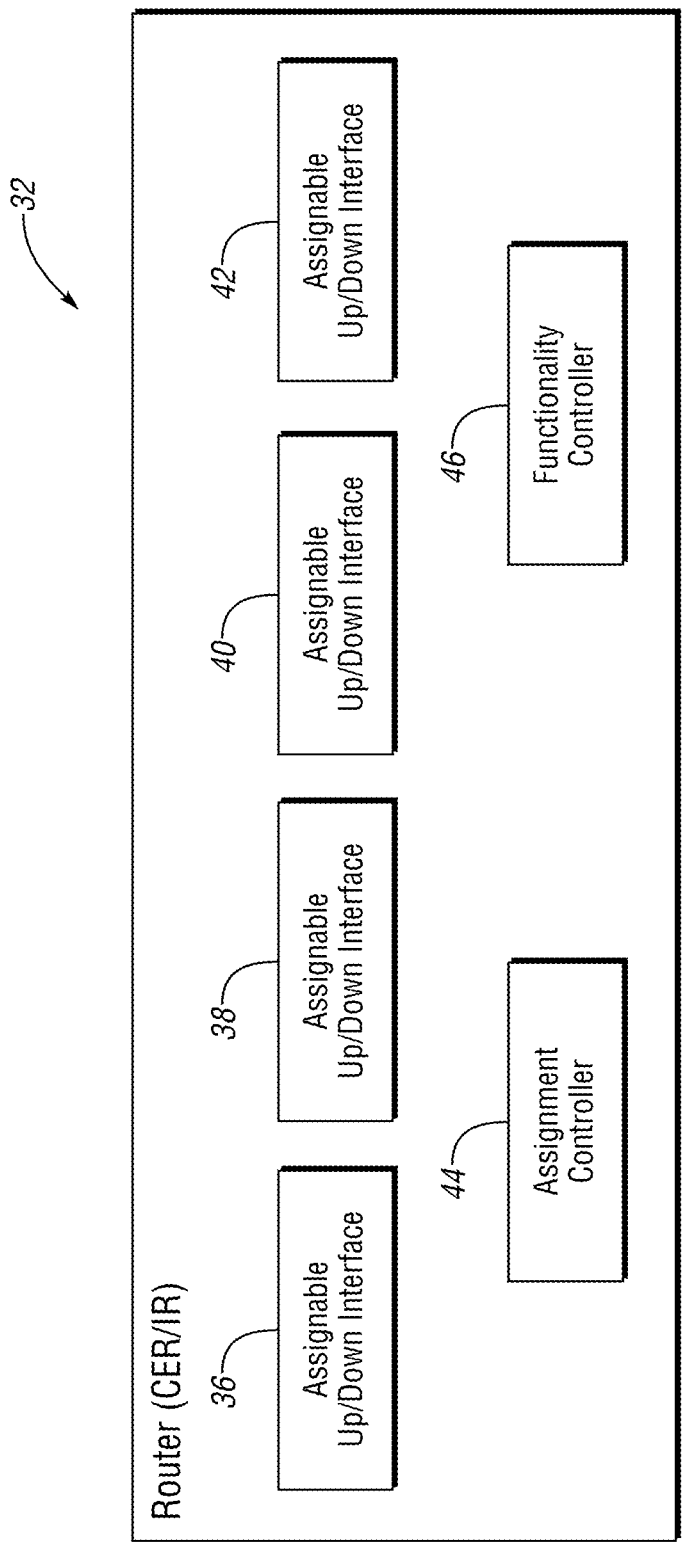
FIG. 2 illustrates an exemplary router in accordance with one non-limiting aspect of the present invention.

FIG. 2 illustrates an exemplary router 32 in accordance with one non-limiting aspect of the present invention. The router 32 is shown to include a plurality of assignable up/down interfaces 36, 38, 40, 42. The interfaces 36, 38, 40, 42 diagrammatically represent receptacles or other connection points included within a router housing to facilitate securing cables, wires, or other tangible mediums used to facilitate communicating signaling from one router to another router within the multi-router network. Of course, the present invention is not necessarily limited to wired interfaces 36, 38, 40, 42 and fully contemplates its operation with suitable wireless interfaces. The router 32 is shown to include four interfaces 36, 38, 40, 42 but may include any number of interfaces, e.g., two, eight, 10, 16, etc. The interfaces 36, 38, 40, 42 are shown to be "assignable" to demonstrate the router 32 being a directionless, configurable or other type of router having capabilities sufficient to permit any one or more of the interfaces 36, 38, 40, 42 to be selectively used as one of an uplink and a downlink interface. The assignable interfaces 36, 38, 40, 42 may be distinguished from fixed or non-assignable interfaces lacking an ability to be selectively implemented as uplink and/or downlink interfaces, such as those commonly employed with directional routers having fixed interface operations, i.e., a single up interface and one or more down interfaces.

One non-limiting aspect of the present invention contemplates automatically assigning each connected interface 36, 38, 40, 42 one of an up directionality and a down directionality, such as to prevent improper inter-router connections and/or looping. The directionality assignments may logically define routing between the interfaces 36, 38, 40, 42, which for exemplary non-limiting purposes is predominately described with respected to routing between a single up interface and one or more down interfaces (the number of down interfaces 36, 38, 40, 42 may vary depending on the number of available interfaces and the number of physical interface connections). Optionally, two or more interfaces 36, 38, 40, 42 may be assigned up directionality, such as in the event the router supports multiple WAN interfaces. The directionality assignment may be performed based on addressing, messaging, data and/or other information received at each interface 36, 38, 40, 42 such that the directionality assigned to each interface 36, 38, 40, 42 depends on the signaling communicated thereto. In this manner, each interface 36, 38, 40, 42 may be dynamically and adaptively assigned directionality depending on the corresponding connection in order to ensure proper router operations. Some routers (e.g. those with a dedicated wireless/DSL/DOCSIS WAN interface) may operate as at least partially directional routers, at least with respect to requiring one or more fixed interfaces.

The router 32 may include an assignment controller 44 to facilitate the contemplated directionality assignment. The assignment controller 44 may be a computer program product embodied in a computer-readable medium having non-transitory instructions stored thereon, which when operable with a processor or other logical functioning element, facilitate assigning each one or more interfaces 36, 38, 40, 42 one of an up directionality and a down directionality. While the assignment controller 44 is shown to be included as part of the router 32, the assignment controller 44 may be a stand-alone component included within the multi-router network 20 and/or positioned elsewhere to facilitate controlling the router 32 to implement the desired directionality assignments. The router (ER and/or the IRs) 32 may be a home Internet Protocol (IP) network (HIPnet) router or other consumer-level router having off-the-shelf, default, pre-configured and/or consumer-level configurations, such as those described in I-D.ietf-v6ops-6204bis, the disclosure of which is hereby incorporated by reference in its entirety. The assignment controller 44 may be included within such HIPnet routers 32 when deployed and/or downloaded thereto from the MSO or other service provider. Of course, the present invention is necessary limited to HIPnet routers 30 to and fully contemplated its use and application with other routers 32 having capabilities sufficient to facilitate assigning interface directionality.

The router 32 may include a functionality controller 46, such as the one described within U.S. patent application Ser. No. 13/792,016, the disclosure of which is hereby incorporated by reference in its entirety. The functionality controller 46 may be configured to facilitate configuring functionality for the router 32, such as to facilitate other router operations following assignment of the contemplated interface directionality and/or to facilitate operations of the router 32 necessary to enable completion of the process described to facilitate assigning interface directionality. The assignment controller 44 and/or the functionality controller 46 may be particularly beneficial with routers deployed within small office and home office (SoHo) environments to facilitate assigning interface directionality and otherwise provisioning the router 32 for proper operation within the multi-router network 20. The use of routers 30 to having one or both of the assignment controller 44 and/or the functionality controller 46 may be particularly beneficial within SoHo environments as such environments may rely on network novices or other individuals lacking ability or desire to program, adjust or otherwise manipulate router functionality in the manner necessary to establish messaging protocols, hierarchical relationships, address assignments, prefix delegations, security measures, backup capabilities and a potential number of additional functional capabilities desired to properly and securely govern network communications.

Figure 3:
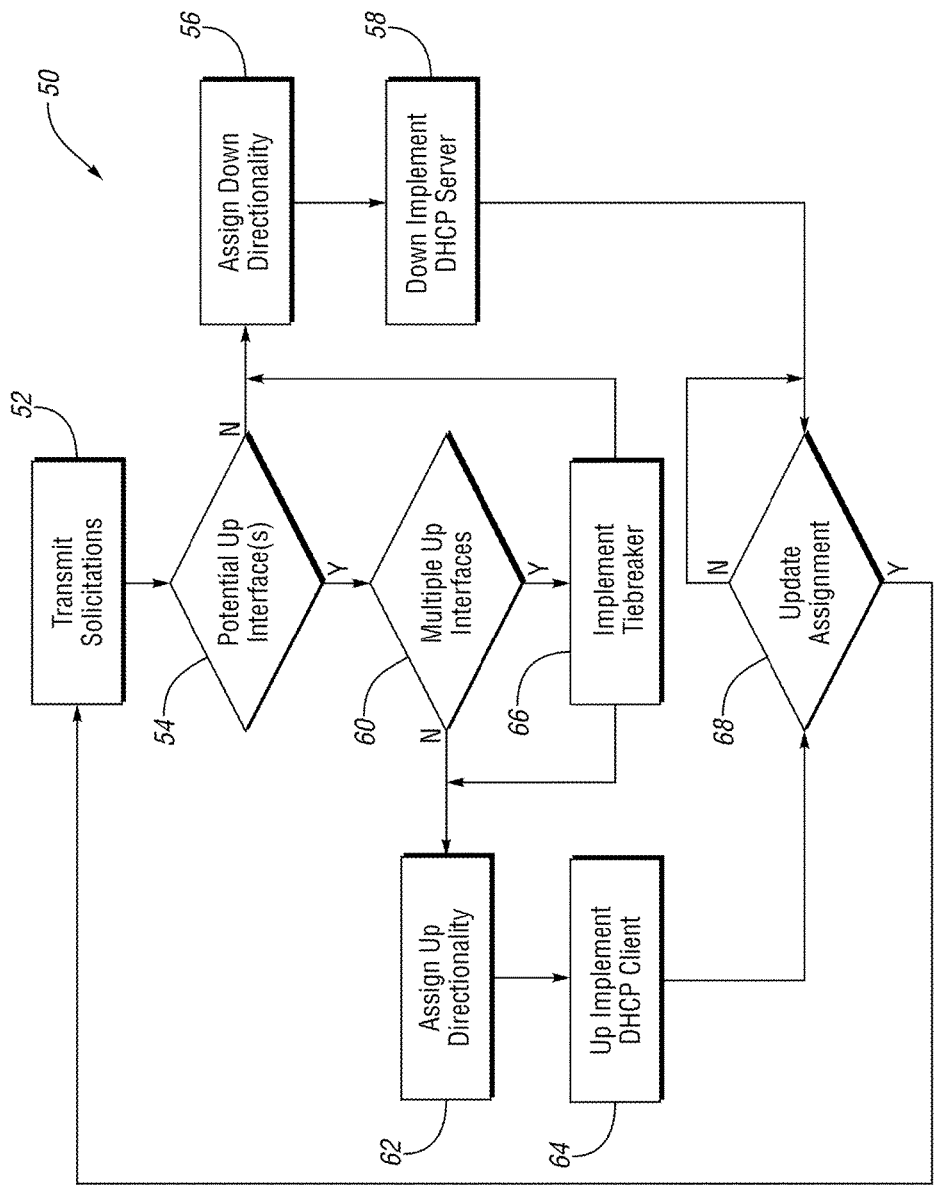
FIG. 3 illustrates a flowchart for a method of assigning interface directionality as contemplated by one non-limiting aspect of the present invention.

FIG. 3 illustrates a flowchart 50 for a method of assigning interface directionality as contemplated by one non-limiting aspect of the present invention. The method may be used to facilitate automatically assigning directionality for routers deployed within a multi-router network or other logical hierarchies defined by physical and/or wireless connectivity according to messaging received at the router's interfaces. One non-limiting aspect of the method contemplates use with directionless and/or configurable routers where each interface and/or each active interface requires assignment of directionality, i.e., up directionality and/or down directionality, in order to facilitate inter-router communications and/or communications with devices connected thereto. The contemplated directionality assignment may be performed with the above-described directionality controller and/or other devices having capabilities sufficient to facilitate instructing or otherwise programming routers to automatically assigning interface directionality. The method is predominately described relative to a single, exemplary router for non-limiting purposes as the present invention fully contemplates multiple routers simultaneously and/or cooperatively executing utilizing the noted operations in order to facilitate directionality assignments.

Block 52 relates to the router desiring interface directionality assignments to transmit solicitation messages. The solicitation messages may be transmitted from each interface of the router and/or limited to the interfaces having an active connection, i.e., each interface connected to a communication medium. The solicitation messages may be communicated from a transmitter or other I/O feature of the router to identify, discover, ascertain or otherwise detect neighboring routers and/or devices. The solicitation messages, for example, may be transmitted as Internet Control Message Protocol (ICMP) router solicitations and/or Dynamic Host Configuration Protocol version 4 (DHCPv4) or Dynamic Host Configuration Protocol version 6 (DHCPv6) solicitations, which are interchangeably referred to herein as a DHCP solicitations. The illustrated method contemplates a scenario where the router initially relies upon ICMP related messaging, such as to perform neighborhood discovery, and thereafter, DHCPv6 related messaging, such as to perform prefix delegation and/or assess assignment. While the method is described with respect to initially employing ICMP and then DHCP, the present invention is not necessarily so limited and fully contemplates reversing the noted order and/or facilitating directionality assignments using one of the ICMP and/or dchpv6 related message or other suitable messaging. Accordingly, while the described methods are shown with a particular order, the ordering is not necessarily intended to limit the scope of the present invention or to require the corresponding operations to be performed according to the illustrated sequence.

The solicitations messages may be transmitted from each interface of the router in order to identify each active interface, i.e., the interfaces capable of transmitting solicitations. The corresponding responses may be an ICMP router advertisement in the event the solicitation was an ICMP router solicitation, a DHCP advertisement in the event the solicitation was a DHCP solicitation or other type of advertisement in the event the multi-router network employs other discovery techniques. Optionally, the advertisements may be received at each active interface without issuance of a corresponding solicitation, such as if the corresponding router/device is configured to automatically and/or periodically issue advertisements, which may be done in order to announce router presences and/or router operation changes. The router may generate a table or database for each received advertisement and its related information, which may include a prefix identifier (globally unique address (GUA), locally unique address (ULA), internal, external, etc.), a timestamp, a lifetime value, a link type (e.g., Ethernet, Multimedia over Coax Alliance (MoCa), LTE, etc.), a bandwidth value (e.g., bits/second), a hop identifier and/or other representations of the corresponding link and/or capabilities of the responding/transmitting router/device.

Block 54 relates to categorize each interface receiving an advertisement as a potential up interface. The interfaces may be characterized as potential up interfaces on the assumption that advertisements must be received from another router in order for the corresponding interface to act as an up interface. Block 56 is reached in the event each of the interfaces fails to receive an advertisement. The absence of an advertisement may indicate an inability of any connected devices to provide a prefix and/or an address or its inability to route messages from the corresponding interface upwardly to another router and/or device. Block 56 relates to assigning the interfaces through which solicitations were transmitted without subsequent receipt of an advertisement with down directionality. Block 58 relates to configuring the interfaces assigned down directionality as DHCP servers. Once configured as a DHCP server, the corresponding interface may implement DHCP procedures to facilitate prefix delegation and/or address assignment to any connected devices, such as by transmitting the DHCP advertisements over the corresponding link. Additionally, other operations may occur once down directionality as assigned, such as to facilitate other inter-router communications and/or to dynamically configure the router/interface to support operations within the multi-router network.

Block 60 relates to assessing whether multiple interfaces received an advertisement. Block 62 is reached if only a single one of the interfaces receives an advertisement. The single interface receiving an advertisement may be automatically assigned up directionality. Block 62 relates to assigning the single receiving interface up directionality and Block 64 relates to that interface optionally implementing DHCP procedures to facilitate prefix delegation and/or address assignment to any connected devices, such as by transmitting corresponding DHCP advertisements over the corresponding link. Additionally, other operations may occur once down directionality as assigned, such as to facilitate other inter-router communications and/or to dynamically configure the router/interface to support operations within the multi-router network. In the event multiple interfaces are considered as potential up interfaces, i.e., more than one interface receives an advertisement, additional processing may be performed to facilitate assigning those interfaces up/down directionality.

Block 66 relates to implementing a tiebreaker in the event multiple interfaces are considered as potential up interfaces. The tiebreaker contemplated by one non-limiting aspect of the present invention presumes no more than one interface can be assigned up directionality, which may be required in the event the router is an HIPnet router or other router limited to operations with a single up interface and/or in the event networking related protocols, e.g., DHCP, require the router to listen to no more than one link at a time. Of course, the present invention is not necessarily limited to assigning up directionality to a single link and fully contemplates its use and application in environments where the router may be configured to support multiple up interfaces, such as if the router supports multi-homing. The exemplary illustration with respect to assigning directionality to no more than one interface is presented as one non-limiting aspect of the present invention contemplates assigning interface directionality within a multi-router network where the routers are particularly limited and their capabilities are limited and/or desired to be limited in order to facilitate ease of implementation and network management. Following completion of the tiebreaker, one of the multiple interfaces considered as potential up interface candidates may be assigned up directionality in Block 62 and the remaining interfaces may be assigned down directionality in Block 56.

Block 68 relates to updating the assigned up/down directionality for each interface. The directionality assignment process may be restarted by returning to Block 52 in the event conditions indicate a need to update the current up/down directionality assignments. Optionally, the process may be restarted automatically as a function of time in order to periodically check the up/down directionality assignments. The process may also be restarted as a function of messaging, signaling and/or other information received at the interfaces following directionality assignment, which may be beneficial in allowing the router, and/or other routers within the multi-router network, to automatically and dynamically update up/down directionality assignments according to changes within the multi-router network, e.g., without requiring a network administrator to manually update the router. The capability to automatically re-assign up/down directionality may be beneficial in allowing the router to support dynamically changing networks, such as those where devices having router capabilities are repeatedly added and removed. Once directionality is established, the router may to listen for advertisements on all interfaces, optionally without acquiring addresses on its down interfaces. If the router initially receives only a ULA address on its up interface and GUA addressing becomes available on one of its down interfaces, the directionality assignment process may restart. If the router stops receiving advertisements on its up interface, the directionality assignment process may restart.

Figure 4:
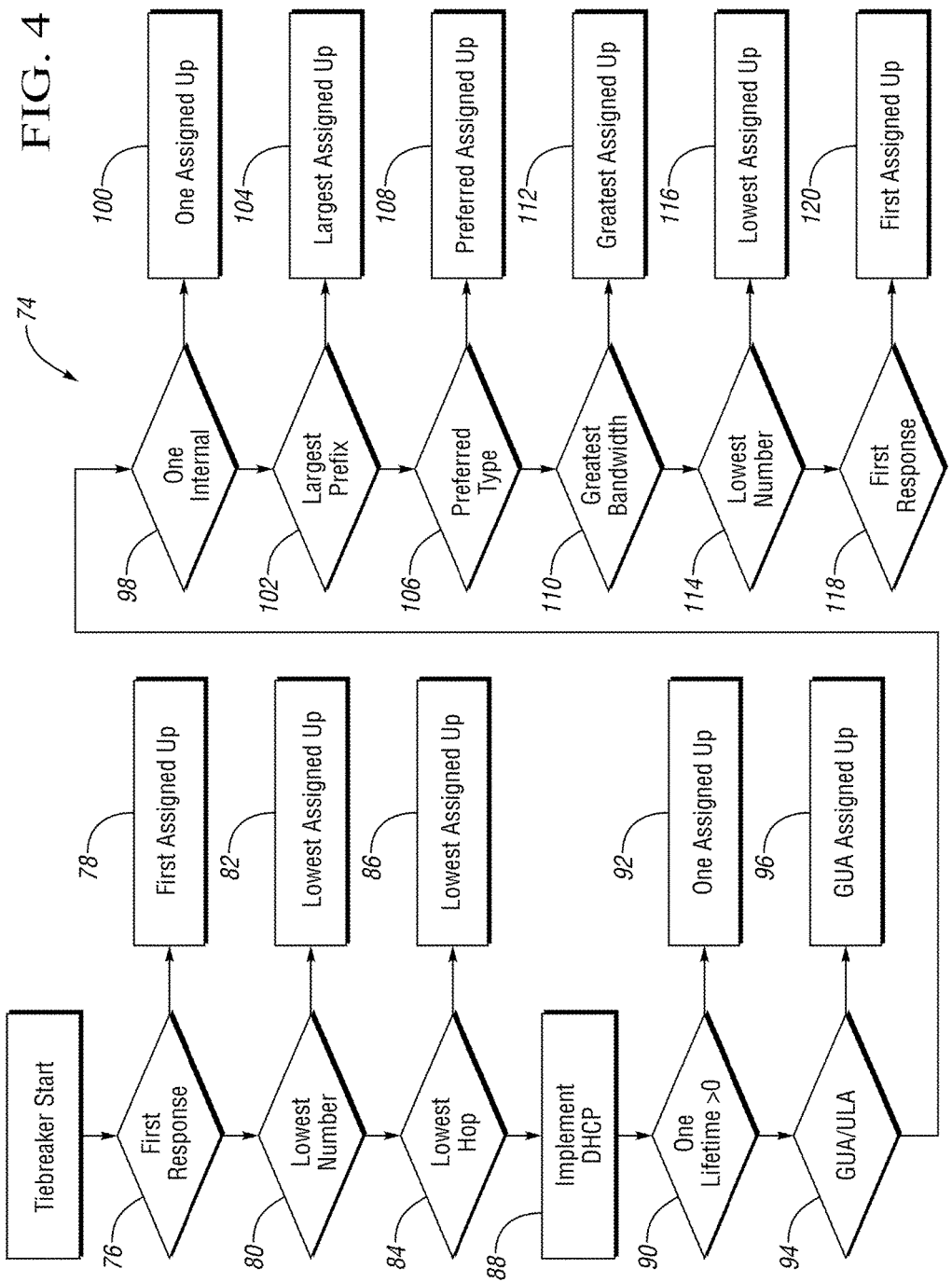
FIG. 4 illustrates a flowchart for a tiebreaker in accordance with one non-limiting aspect of the present invention.

FIG. 4 illustrates a flowchart 74 for a tiebreaker in accordance with one non-limiting aspect of the present invention. The tiebreaker may correspond with the tiebreaking process performed in Block 66 of FIG. 3. The tiebreaker is illustrated for exemplary non-limiting purposes with respect to initially processing ICMP router advertisements, and depending on whether the ICMP based processing is able to assign one of the interfaces up directionality, subsequently processing DHCP advertisements to assign one of the interfaces up directionality, and thereby, the remaining interfaces down directionality. The use of ICMP to initially assign up/down directionality may be beneficial in allowing the directionality assignments to occur prior to rely upon DHCP as the router may be configured to initially perform neighborhood discovery or other operations according to ICMP prior to enabling or engaging its DHCP capabilities. The ICMP processes, however, may be bypassed in the event preference for DHCP is determined and/or the router is unable to support ICMP or other neighborhood discovery processes and/or protocols. Accordingly, while the tiebreaker is illustrated to include a number of processes, the tiebreaker may be implemented without necessarily performing the operations in the illustrated sequence.

Blocks 76, 78 relate to determining the interface receiving a first responding one of the ICMP advertisements and assigning that interface up directionality and any remaining interfaces down directionality. The time that each ICMP advertisement is received may be determined according to a timestamp or other information transmitted with the corresponding message. Blocks 80, 82 relates to assessing the prefixes included within the ICMP advertisements and assigning the interface associated with the lowest numbered prefix up directionality and the remaining interfaces down directionality. Block 80 may be reached in the event Block 76 determines multiple responses being received at approximately the same time and/or in the event the first response assessment is bypassed or otherwise not performed. Blocks 84, 86 to assessing a lowest hop count for the ICMP advertisements and assigning the interface associate with the lowest hop count up directionality and the remaining interfaces down directionality. The hop count may be identified within each of the ICMP advertisements such as within a Router Prefix Information option (PIO). The hop count, for example, may be used to identify number of hops between the router transmitting the corresponding advertisement and an edge router or other benchmark within the multi-router network.

Block 88 relates to implementing analysis of DHCP advertisements in the event the ICMP process failed to assign an up interface and/or in the event the ICMP process is bypassed or otherwise disregarded. The DHCP portion of the tiebreaker, as with the ICMP portion, is shown to include a particular sequence of assessments where each assessment may reached in turn following an unsuccessful prior assessment in order to facilitate assigning directionality according to a preference order. The assessment ordering may be varied and/or adjusted, including limiting certain assessments and/or prioritizing or de-prioritizing certain assessments, according desired operational preferences. The illustrated ordering is believed to be beneficial in identifying the interfaces receiving advertisements from a highest router within the multi-router networking hierarchy and with the most certainty while performing the least number of assessments, at least given operational limitations, i.e., based on information carried with the advertisements. Other assessments, including those performed without reliance on advertisement carried information may be performed without deviating from the scope and contemplation of the present invention.

Blocks 90, 92 relate to assessing lifetime associated with the DHCP advertisements, and when no more than one of the interfaces is associated with a lifetime greater than zero, assigning that interface up directionality and the remaining interfaces down directionality. Blocks 94, 96 relate to assessing whether prefixes identified within the DHCP advertisements are associated with GUA and/or ULA, and when no more than interface is associated with GUA, assigning that one of the interfaces up directionality and the remaining down directionality. Blocks 98, 100 relate to assessing whether prefixes identified within the DHCP advertisements are associated with external prefixes and internal prefixes, and when no more than one of the interface is associated with an internal prefix, assigning that interface up directionality and the remaining interfaces down directionality. Blocks 102, 104 relate to assessing size of prefixes identified within the DHCP advertisements, and when the size of the prefixes for one interface is larger than the others, assigning that one of the at least interfaces up directionality and the remaining at least one of the first and second interfaces down directionality. Blocks 106, 108 relate to assessing link type associated with the DHCP advertisements/interfaces, and when no more than one of the interfaces is associated with a desired link type, assigning that one of the interfaces up directionality and the remaining interfaces down directionality. Blocks 110, 112 relate to assessing link bandwidth, and assigning the interface having the greatest link bandwidth up directionality and the remaining interfaces down directionality. Blocks 114, 116 relate to assessing prefixes identified within the DHCP advertisements, and assigning the interface having the lowest prefix number up directionality and the remaining interfaces down directionality. Blocks 118, 120 relate to assessing times at which the interfaces each receive the DHCP advertisements, and assigning the interface having an earliest time up directionality and assigning the remaining at interfaces down directionality.

As supported above, the contemplated directionality assignments may be performed based on advertisements and the information carried therein. The reliance on advertisement may be beneficial in allow directionality assignments without reliance on dynamic routing protocols, such as Routing Information Protocol (RIP) and the Open-Shortest-Path-First protocol (OSPF), the disclosures of which are hereby incorporated by reference. The routing protocol may correspond with routing tables and other information provided to the router to facilitate determining the relative position within the multi-router network. The routing tables may define routes between each one or more of the routers (ER, IRs) and/or known to the routers such that the receiving router is then responsible for comparing the tables to determine its relative positioning. The capability of the present invention to facilitate directional assignment without use of such routing protocols may be advantageous with routers that may not be configured with capabilities to process such routing tables, within environments where it may be difficult or impossible to provide desired routing tables to the routers and/or to facilitate implementation of the contemplated role based router functionality selection without having to update or comply with routing protocol requirements.

Figures 5A, 5B:
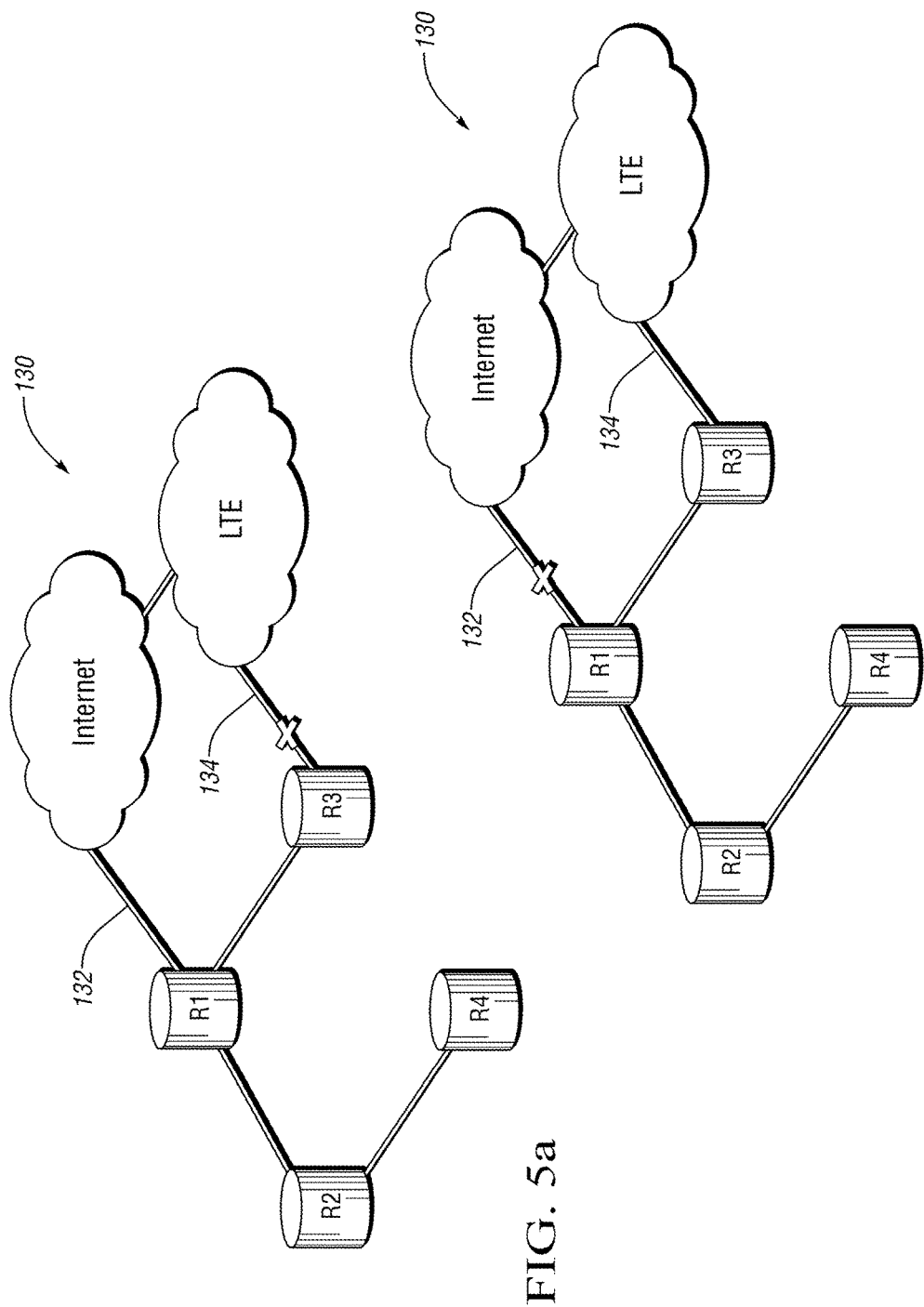
FIGS. 5a-5b illustrate a backup router system in accordance with one non-limiting aspect of the present invention.

FIGS. 5a-5b illustrate a backup router system 130 in accordance with one non-limiting aspect of the present invention. The backup router system 130 is shown to comprise a first router (R1), a second router (R2), a third router (R3) and a fourth router (R4) interconnected to form a multi-router network, such as one similar to that described above with respect to FIG. 1. The illustrated first, second, third and fourth routers may be similarly configured to the routers described above, including the exemplary router illustrated in FIG. 2. The backup router system 130 is illustrated for exemplary purposes to demonstrate one capability of the present invention to leverage use of the contemplated directionality assignment process to facilitate implementing a backup strategy. The backup strategy may be utilized in the event a primary connection 132 of the first router (ER) fails or is otherwise unavailable to permit use of a secondary connection 134 outside or external of the multi-router network. While the primary and secondary network connections 132, 134 may correspond with various types of connections, the primary network connection 132 is shown to correspond with an Internet connection in the secondary connection 134 is shown to correspond with a Long Term Evolution (LTE) connection. In this manner, if the Internet connection 132 becomes unavailable, the LTE connection 134 may be utilized to continue communications with the multi-router network.

Each router may be configured to independently assigned interface directionality to each of its interfaces according to the processes described above. Once interface directionality assignments are made, the routers may be configured to identify the one of the routers to be characterized as the ER (e.g., R1) according to an edge detection methodology. The ER for exemplary purposes selected to correspond with the primary connection 132, which may be accomplished by programming the third router to disregard the second connection 134. In this manner, a position detection module, such as one described in U.S. patent application Ser. No. 13/792,016, may be configured to determine positioning of the router or its role within the multi-router network, i.e., whether the router is an ER or an IR, as a function of messaging and/or addressing associated with assigning the router an address and/or a prefix. Following the positional determinations and successful identification of the ER (R1), each of the remaining IRs (R2, R3, R4) may dynamically assign addressing and/or implement functionality controls. Thereafter, in the event the primary connection is lost or otherwise unavailable, the first router (initially characterized ER) may signify loss of the connection by transmitting a DHCPv6 router advertisement with a lifetime of zero to the downstream connected routers, e.g., the second router in the third router.

Upon receiving the lifetime value equal to zero, the remaining routers may activate the backup process whereby the routers assess whether a secondary connection available to it. Each router having a secondary connection available to it may then generate its own DHCPv6 router advertisement with a lifetime greater zero to indicate capabilities to facilitate prefix delegation for the corresponding secondary connection (e.g., external GUA). In the event multiple routers generate router advertisements for available secondary connections, the first advertising router may be considered to have preference. The exemplary scenario illustrated in FIGS. 5a-5b depicts availability of only a single secondary connection such that the third router automatically becomes the backup router, i.e. the only remaining router capable of delegating addressing and/or prefixes for a secondary connection outside of the multi-router network, assuming the secondary connection is still available. Thereafter, the remaining routers may re-assess interface directionality and edge detection using the dynamic techniques contemplated by the present invention such that the network may be automatically reconfigured according to the third router being characterized as a new ER. FIG. 5b is shown to include similar router connections has those occurring before loss of the primary connection; however, this is done for exemplary non-limiting purposes as the adaptive pre-configurations may result in the routers automatically establishing new default routes and connections with the other routers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for assigning up and down directionality to interfaces of a router deployed within a multi-router network without requiring the router to rely on routing protocols of the type employing routing tables or other information sufficient to indicate relative position of the router within the multi-router network, the router including three or more interfaces including at least at least a first interface and two or more second interfaces,
wherein each of the three or more interfaces of the router are dynamically configurable such that each of the interfaces is capable of selectively acting as one of an up interface with an up directionality and a down interface with a down directionality,
the router being one of a plurality of routers connected in a hierarchical relationship to form the multi-router network, the hierarchical relationship characterized by one of the plurality of routers operating as an edge router and each remaining one of the plurality of routers operating as an internal router, the edge router interfacing with a wide area network (WAN) on behalf of the multi-router network such that all routing between the WAN and the multi-router network route through the edge router, the method comprising:

receiving via a plurality of the interfaces of the router one or more advertisements communicated over the multi-router network from another one or more of the plurality routers;

processing the advertisements at the router to identify each interface receiving one of the advertisements, the identified interfaces including at least a first interface and one or more second interfaces;

based on the identified interfaces including at least the first interface and one or more second interfaces, automatically implementing a directionality tiebreaker without requiring the router to rely on routing protocols of the type employing routing tables or other information to indicate relative position of the router within the multi-router network and without requiring a network administrator to correspondingly update the router, the directionality tiebreaker automatically assigning a single one of the at least first and at least second interfaces up directionality and automatically assigning remaining interfaces of the router down directionality such that no more than one of the interfaces is assigned the up directionality, wherein the interface of the router assigned the up direction functionality is enabled to route messages upstream from the router and prevented from routing messages downstream from the router and the remaining interfaces of the router assigned the down direction functionality are enabled to route messages downstream from the router and prevented from routing messages upstream from the router.

2. The method of claim 1 further comprising receiving the advertisements as an Internet Control Message Protocol (ICMP) router advertisements.

3. The method of claim 2 further comprising the directionality tiebreaker:

assessing a time at which the at least first and second interfaces each receive one of the ICMP router advertisements; and assigning one of the at least first and second interfaces having an earliest of the time up directionality and assigning the remaining at least one of the first and second interfaces down directionality.

4. The method of claim 3 further comprising the directionality tiebreaker:

when the time for both of the first and second interfaces is the same, assessing prefixes associated with the ICMP router advertisements received at the at least first and second interfaces;

assigning one of the at least first and second interfaces having a lowest numbered prefix up directionality and assigning the remaining at least one of the first and second interfaces down directionality.

5. The method of claim 4 further comprising the directionality tiebreaker:

when the prefix for both of the first and second interfaces is the same, assessing hop count associated with the ICMP router advertisements received at the at least first and second interfaces;

assigning one of the at least first and second interfaces having a lowest hop count up directionality and assigning the remaining at least one of the first and second interfaces down directionality; and thereby automatically assigning the up and down directionalities as a function of non-positional information and without requiring the router to rely on routing protocols of the type employing routing tables or other information to indicate relative position of the router within the multi-router network.

6. The method of claim 2 further comprising assigning the up and down directionality according to Dynamic Host Configuration Protocol version 6 (DHCPv6) advertisements only if the ICMP advertisements are insufficient.

7. The method of claim 6 further comprising the directionality tiebreaker:

assessing lifetime associated with the DHCPv6 advertisements received at the at least first and second interfaces; and when no more than one of the at least first and second interfaces is associated with a lifetime greater than zero, assigning that one of the at least first and second interfaces up directionality and the remaining at least one of the first and second interfaces down directionality.

8. The method of claim 7 further comprising the directionality tiebreaker:

when the lifetime for both of the first and second interfaces is greater than zero, assessing whether prefixes identified within the DHCPv6 advertisements received at the at least first and second interfaces are associated with globally unique addresses (GUA) and unique local addresses (ULA); and when no more than one of the at least first and second interfaces is associated with a GUA, assigning that one of the at least first and second interfaces up directionality and the remaining at least one of the first and second interfaces down directionality.

9. The method of claim 8 further comprising the directionality tiebreaker:

when both of the first and second interfaces is associated with a corresponding GUA, assessing whether prefixes identified within the DHCPv6 advertisements received at the at least first and second interfaces are associated with external prefixes and internal prefixes; and when no more than one of the at least first and second interfaces is associated with an internal prefix, assigning that one of the at least first and second interfaces up directionality and the remaining at least one of the first and second interfaces down directionality.

10. The method of claim 9 further comprising the directionality tiebreaker:

when both of the first and second interfaces is associated with an internal prefix, assessing size of prefixes identified within the DHCPv6 advertisements received at the at least first and second interfaces; and when the size of the prefixes for one of the at least first and second interfaces is larger than the others, assigning that one of the at least first and second interfaces up directionality and the remaining at least one of the first and second interfaces down directionality.

11. The method of claim 10 further comprising the directionality tiebreaker:

when the size for both of the first and second interfaces is the same, assessing link type associated with the DHCPv6 advertisements received at the at least first and second interfaces is one of at least a first link type and a second link type; and when no more than one of the at least first and second interfaces is associated with the first link type, assigning that one of the at least first and second interfaces up directionality and the remaining at least one of the first and second interfaces down directionality.

12. The method of claim 11 further comprising the directionality tiebreaker:

when the link type for both of the first and second interfaces is the same, assessing link bandwidth associated with the at least first and second interfaces; and assigning the one of the at least first and second interfaces having a greatest of the link bandwidth up directionality and the remaining at least one of the first and second interfaces down directionality.

13. The method of claim 12 further comprising the directionality tiebreaker:

when the bandwidth for both of the first and second interfaces is the same, assessing prefixes identified within the DHCPv6 advertisements received at the at least first and second interfaces; and assigning the one of the at least first and second interfaces having the lowest prefix number up directionality and the remaining at least one of the first and second interfaces down directionality.

14. The method of claim 13 further comprising the directionality tiebreaker:

when the prefix number for both of the first and second interfaces is the same, assessing a time at which the at least first and second interfaces each receive one of the DHCPv6 advertisements;

assigning one of the at least first and second interfaces having an earliest of the time up directionality and assigning the remaining at least one of the first and second interfaces down directionality; and thereby automatically assigning the up and down directionalities as a function of non-positional information and without requiring the router to rely on routing protocols of the type employing routing tables or other information to indicate relative position of the router within the multi-router network.

15. The method of claim 1 further comprising:

automatically assigning the up and down directionalities with an assignment controller operating on the router, including automatically assigning each of the interfaces not assigned the up directionality the down directionality; and automatically implementing with a functionality controller operating on the router a routing protocol following assignment of the up and down directionality to each of the interfaces, the routing protocol requiring each interface assigned down directionality to route all upstream communications to the interface assigned the up directionality and requiring the router to listen to no more than a link connected to the interface assigned the up directionality when obtaining an address and/or a prefix from a Dynamic Host Configuration Protocol (DHCP) server.

16. The method of claim 1 further comprising:

generating a table at the router for tracking information included with each advertisement received at the router, the information tracked in the table including one or more of:
i) a prefix identifier;
ii) a timestamp;
iii) a lifetime value;
iv) a link type;
v) a bandwidth value;
vi) a hop identifier; and implementing the directionality tiebreaker using a processor of the router to execute a plurality of instructions stored within a non-transitory computer-readable medium of the router, the plurality of instructions being sufficient for implementing the directionality tiebreaker as a function of the information tracked in the table.

17. The method of claim 1 further comprising assigning the up and down directionality prior to routing communications through the router in either one of an upstream direction and a downstream direction.

18. A computer program product embedded in a computer-readable medium having non-transitory instructions stored thereon, the instructions for execution with a processor of a router to facilitate assigning up and down directionality to three or more interfaces of the router when deployed within a multi-router network, wherein each of the three or more interfaces of the router are dynamically configurable such that each of the interfaces is capable of selectively acting as one of an up interface with an up directionality and a down interface with a down directionality, the medium including instructions for:

identifying each interface receiving at least one advertisement from other routers within the multi-router network, the interfaces including multiple interfaces of the router;

based on multiple interfaces receiving one of the advertisements, implementing a directionality tiebreaker as a function of non-positional information included within the advertisements received at the multiple interfaces, the directionality tiebreaker assigning a single one of the multiple interfaces up directionality and the remaining interfaces of the router down directionality; and implementing a routing protocol following assignment of the up and down directionality, the routing protocol requiring each interface assigned down directionality to route all upstream communications to the interface assigned the up directionality for further upstream communication, wherein the one interface of the router assigned the up direction functionality is enabled to route messages upstream from the router and prevented from routing messages downstream from the router and the remaining interfaces of the router assigned the down direction functionality are enabled to route messages downstream from the router and prevented from routing messages upstream from the router.

19. The computer program product of claim 18 further comprising the instructions being sufficient for:

identifying the advertisements when Internet Control Message Protocol (ICMP) router advertisements and when Dynamic Host Configuration Protocol version 6 (DHCPv6) advertisements;

implementing the directionality tiebreaker without determining a relative position of the router within the multi-router network and such that the up directionality and the down directionality is assigned as a function of information included in the ICMP router advertisements, and thereafter if the ICMP router advertisements are insufficient for assigning the up and down directionality, as a function of the DHCPv6 advertisements; and implementing a positional determination after the up direction and the down directionality is assigned to each interface, the position determination determining whether the router is positioned within the multi-router network at one of an edge position and an internal position.

20. A router comprising:

a plurality of interfaces configured for routing data packets, the plurality of interfaces being of directionless and dynamically configurable such that each of the plurality of interfaces is capable of selectively acting as one of an up interface with an up directionality and a down interface with a down directionality; and an assignment controller configured to assign no more than one of the plurality of interfaces up direction functionality and each of the remaining interfaces down direction functionality, wherein the no more than one interface assigned the up direction functionality is enabled to route messages upstream from the router and prevented from routing messages downstream from the router and the remaining interfaces assigned the down direction functionality are enabled to route messages downstream from the router and prevented from routing messages upstream from the router; and wherein the assignment controller is configured to selectively assign the up and down direction functionality as a function of non-positional information included in messaging communicated to the corresponding interface, thereby assigning the up and down direction functionality on an interface-by-interface basis depending on messaging received at each interface, the selectively assigning performed by:

determining a number of potential up interfaces of the router;

when there are no potential up interfaces, assigning all interfaces of the router down direction functionality;

when there is no more than one potential up interface, assign the one potential up interface up direction functionality and each remaining interface of the router down direction functionality; and when there are multiple potential up interfaces, implementing a directionality tiebreaker as a function of non-positional information included in the messaging received by the multiple potential up interfaces to select one of the potential up interfaces up direction functionality and each remaining interface of the router down direction functionality.

* * * * *